UNITED STATES PATENT OFFICE.

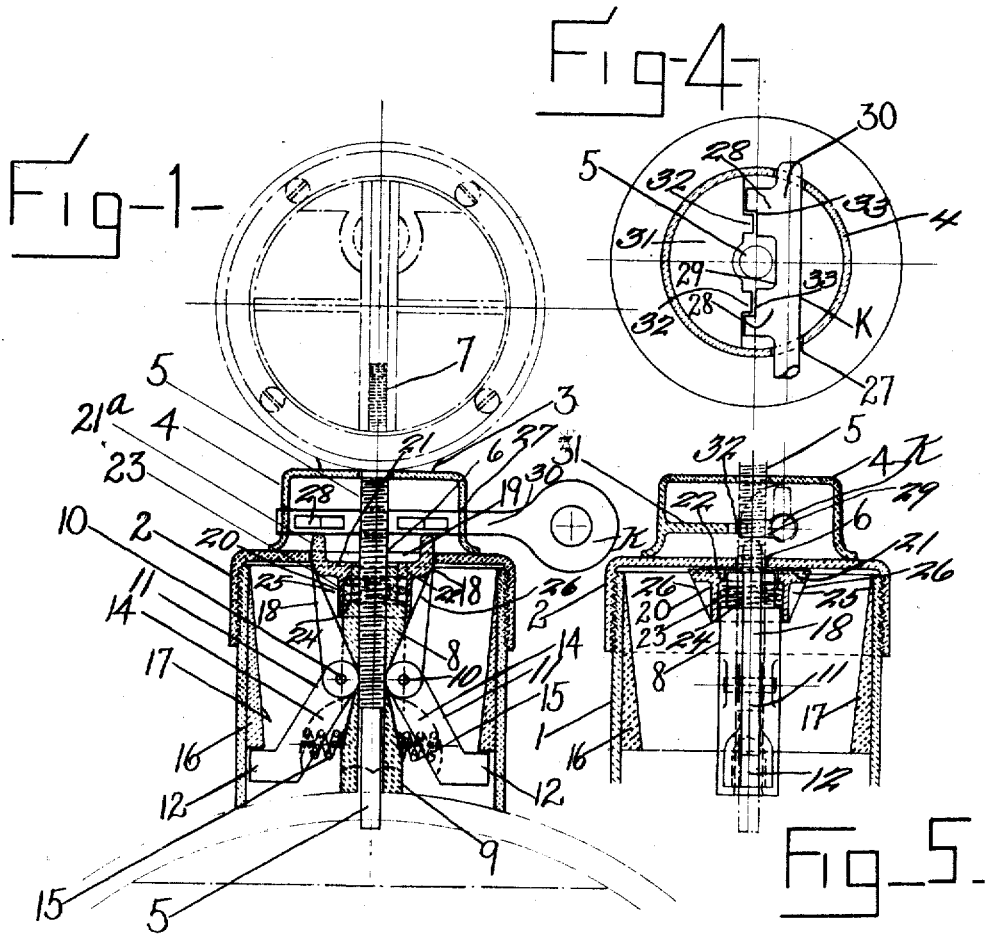

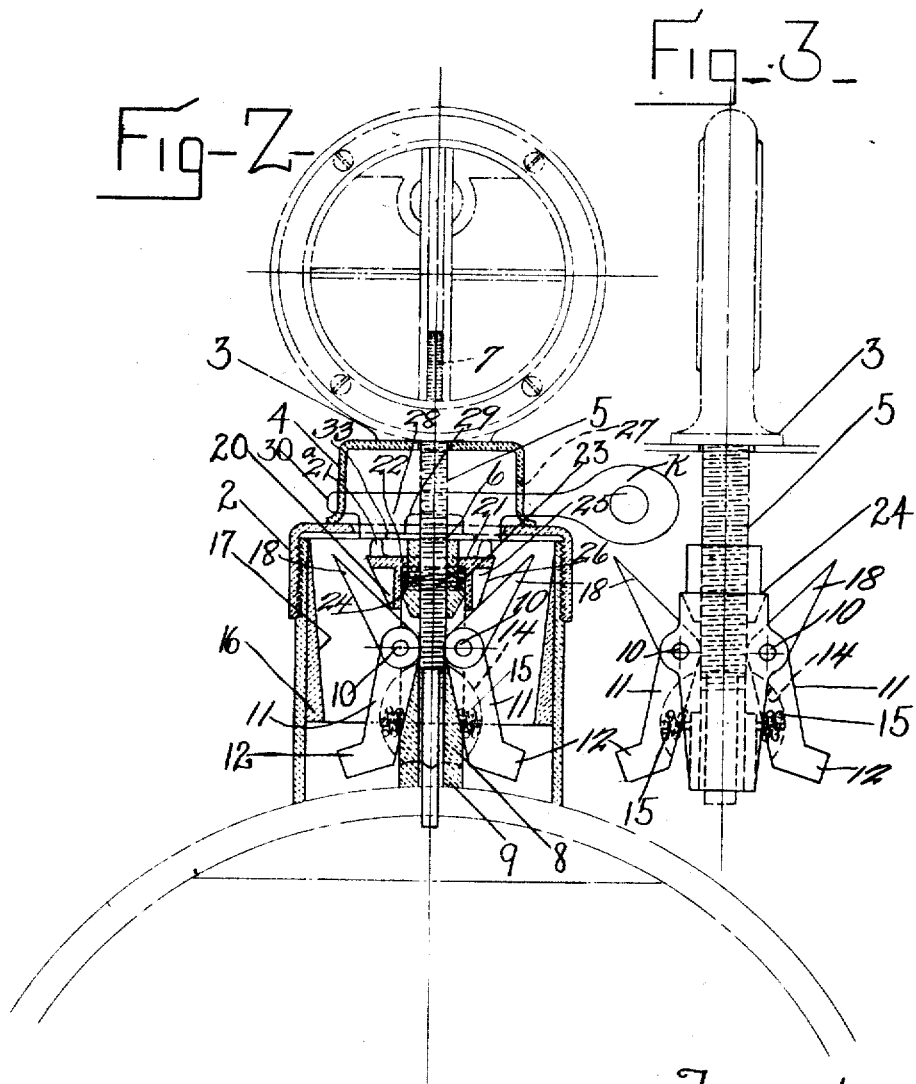

ANTHONY BONZA, OF FELTON, DELAWARE.

LOCKING MECHANISM.

1,383,784.　　　　Specification of Letters Patent.　　Patented July 5, 1921.

Application filed December 4, 1920.　Serial No. 428,415.

*To all whom it may concern:*

Be it known that I, ANTHONY BONZA, a citizen of the United States, residing at Felton, in the county of Kent and State of Delaware, have invented certain new and useful Improvements in Locking Mechanisms, of which the following is a specification, reference being had to the accompanying drawings.

This invention relates to certain improvements in locking mechanisms, and it is primarily an object of the invention to provide a novel and improved mechanism particularly adapted and designed for use in connection with a motor meter or the like so that said meter, when in applied position upon a radiator, may be effectively held against removal by an unauthorized person.

Another object of the invention is to provide a novel and improved mechanism of this general character which automatically operates to effect the requisite locking or holding engagement and wherein means are provided, operable by a key, for releasing the mechanism from holding or engaging position.

The invention consists in the details of construction and in the combination and arrangement of the several parts of my improved locking mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in vertical section and partly in elevation illustrating a locking mechanism constructed in accordance with an embodiment of my invention, certain parts being diagrammatically indicated by dotted lines.

Fig. 2 is a view similar to Fig. 1 but showing the mechanism in release position.

Fig. 3 is an elevational view illustrating the locking mechanism when the coacting member or element is retracted.

Fig. 4 is a horizontal sectional view taken through the base or housing of the indicating means or meter, and Fig. 5 is a view partly in vertical section and partly in end elevation of the mechanism as herein disclosed.

As disclosed in the accompanying drawings, 1 denotes the filler neck of a radiator comprised in a liquid cooling system for an internal combustion engine and with which is engaged in a conventional manner a closure member or cap 2. Mounted upon the closure member or cap 2 is the frame 3 of a motor meter of a type now generally in use and which frame includes a hollow base or housing 4 having direct contact with the closure member or cap 2.

The frame 3 is also provided with a depending stem 5 which extends through the base or housing 4 and through an opening 6 in the central portion of the closure member or cap 2 and terminates a distance below said cap or closure 2 so that when the cap is applied to the filler neck 1, the lower portion of said stem 5 is arranged within the filler neck. Disposed through the stem 5 and extending within the frame 3 is a thermostatic device 7 of a conventional type and which operates to indicate the thermal condition of the engine.

Threaded or otherwise secured upon the free or depending portion of the stem 5 is a bushing or sleeve 8 herein disclosed as held in applied position by the clamping or binding screw 9. Pivotally engaged, as at 10, with the sleeve or bushing 8 at diametrically opposed points and substantially midway thereof are the downwardly diverging arms 11 terminating in the outwardly directed lugs or fingers 12. The inner face of each of the arms 11 at the lower portion thereof is provided with a pocket or recess 14.

Seating within said pocket 14 is an end portion of an expansible member or coil spring 15, the opposite end portion of which bears against the lower portion of the bushing or sleeve 8. By this means each of the arms 11 is constantly urged upwardly so that the outstanding lug 12 thereof is caused to automatically extend below the sleeve 10 secured within the upper portion of the filler neck 1. The wall of the sleeve 10 is gradually reduced in thickness from its lower edge to its upper edge so that the inner face 17 of said sleeve operates as a cam to force the arms 11 inwardly while the cap or closure 2 is being applied. However, just before the cap or closure 2 is completely applied to the filler neck 1, the lugs 12 of the arms 11 will move outwardly and extend below the lower edge of the sleeve 16, whereby the cap or closure 2 and the parts carried thereby are locked against removal and particularly by an unauthorized person.

The pivoted or upper end portions of the arms 11 are continued by the upwardly directed and converging pointed dogs or tail pieces 18 of a length to closely approach the inner face of the closure or cap 2 but capable of unhindered rocking or swinging movement so that when said dogs or tail pieces 18 are swung outwardly and downwardly, the arms 11 will be retracted against the tension of the expansible members or springs 15 so that the lugs 12 may be disengaged from beneath the lower edge of the sleeve 16 so that the cap or closure member and the parts carried thereby may be renewed when desired.

Normally, the free or pointed extremities of the dogs or tail pieces 18 are positioned closely adjacent to the outer ends of the opposed slots 19 radiating from the opening 6 in the cap or closure 2. The cylindrical member 20 depends from the inner marginal portion of an annular member 21 arranged inwardly of the closure member or cap 2. The inner marginal portion of said annular member extends slightly inward of the bore of the cylindrical member 20 to provide a shoulder 22 with which contacts an expansible member 23, herein disclosed as a coil spring surrounding the upper portion of the sleeve or bushing 8 and also bearing against a shoulder 24 produced by reducing said upper portion of the sleeve or bushing 8. This expansible member or spring 23 is of such length and tension as to normally maintain the cylindrical member 20 at the limit of its upward or outward movement for a purpose to be hereinafter referred to. The member 21 at diametrically opposed points and adjacent its periphery is provided with the outstanding lugs 21ᵃ which are adapted to extend within the lower portion of the base or housing 4 through the slots 19.

Integrally formed with the outer face of the cylindrical member 20 and the under face of the annular member 21 are the webs 25 and the outer edges of said webs are beveled downwardly and inwardly to provide cams 26 which, upon downward movement of the cylindrical member 20, engage the inner edges of the dogs or tail pieces 18 to impart separating movement thereto whereby the arms 11 will be retracted.

The side wall of the base or housing 4 is provided with a horizontally directed keyhole 27 through which is adapted to be inserted a key K provided at its inserted portion with a blade 28. The central portion of the blade 28 is cut away as at 29 so that the same may readily pass the stem 5 when the key is rotated in a direction to bring the blade 28 into contact with the outstanding lugs 21ᵃ for the purpose of depressing the cylindrical member 20.

The shank 30 of the key K, when inserted within the base or housing 4, is positioned to one side of the stem 5. Arranged at the opposite side of the stem 5 is a horizontally disposed plate or septum 31 arranged within the housing or base 4 and supported by the wall thereof. The inner or free edge or margin of the plate or septum 31 at opposite sides of the stem 5 is provided with outwardly directed fingers or lugs 32 coplanar therewith.

The blade 28 in its outer marginal portion is provided with the recesses 33 positioned in proper relation with respect to the lugs or fingers 32 to permit the key to have unobstructed or unhindered movement toward or from the annular member 21. By this means, it will be perceived that a great many different arrangements of the lugs or fingers 32 may be effected so that, in practice, each user may be in possession of an individual operating key so that the possibility of the member 20 being depressed to release the lugs or fingers by an unauthorized person is materially reduced.

From the foregoing description it is thought to be obvious that a locking mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a tubular member having one end open and provided with an internal shoulder, a cap for closing said open end of the tubular member, a part carried by the cap and extending within the tubular member when the cap is in applied position, a movable arm carried by said part for coaction with the shoulder to hold the cap against displacement, automatic means for moving the arm into position to coact with said shoulder, said arm being provided with an angularly disposed dog, a member having movement lengthwise of the part and contacting with the dog upon movement in one direction to swing the arm free of the shoulder, means for imparting movement to the last named member in said direction, and automatic means for imparting movement to said second named member in the opposite direction.

2. In combination with a tubular member having one end open and provided with an internal shoulder, a cap for closing said open end of the tubular member, a part carried by the cap and extending within the tubular member when the cap is in applied position, a movable arm carried by said part for coaction with the shoulder to hold the cap against displacement, automatic means for moving the arm into position to coact with said shoulder, said arm being provided with an angularly disposed dog, a member having movement lengthwise of the part and contacting with the dog upon movement in one direction to swing the arm free of the shoulder, means for imparting movement to the last named member in said direction, a housing carried by the cap and positioned at the side of the cap remote from the part, said second named member extending within said housing through the cap, and means insertible within the housing for engagement with said second named member to move the same in a direction to engage the dog.

3. In combination with a tubular member having one end open and provided with an internal shoulder, a cap for closing said open end of the tubular member, a part carried by the cap and extending within the tubular member when the cap is in applied position, a movable arm carried by said part for coaction with the shoulder to hold the cap against displacement, automatic means for moving the arm into position to coact with said shoulder, said arm being provided with an angularly disposed dog, a member having movement lengthwise of the part and contacting with the dog upon movement in one direction to swing the arm free of the shoulder, means for imparting movement to the last named member in said direction, a housing carried by the cap and positioned at the side of the cap remote from the part, said second named member extending within said housing through the cap, and selective means insertible within the housing for engagement with said second named member to move the same in a direction to engage the dog.

In testimony whereof I hereunto affix my signature.

ANTHONY BONZA.